United States Patent [19]
Cottman

[11] 3,935,281
[45] Jan. 27, 1976

[54] PHENOLIC ANTIOXIDANTS PREPARED FROM A PENTACYCLO-TETRADECA-5,11-DIENE

[75] Inventor: Kirkwood S. Cottman, Akron, Ohio

[73] Assignee: The Goodyear Tire & Rubber Company, Akron, Ohio

[22] Filed: May 6, 1974

[21] Appl. No.: 467,424

[52] U.S. Cl...... 260/619 B; 260/45.7 R; 260/45.95; 260/612 R; 260/613 R; 260/619 D
[51] Int. Cl.² ................. C07C 37/14; C07C 39/17
[58] Field of Search .......... 260/619 D, 45.95, 619 B

[56] References Cited
UNITED STATES PATENTS

| | | |
|---|---|---|
| 2,831,898 | 4/1958 | Ecke et al. ............... 260/619 D X |
| 2,834,814 | 5/1958 | Bain et al. ............... 260/619 D X |
| 3,036,138 | 5/1962 | Mingasson et al. ........ 260/619 D X |
| 3,357,948 | 12/1967 | Stockmann et al. ....... 260/619 D X |
| 3,419,624 | 12/1968 | Cotter et al. ............. 260/619 D |
| 3,692,844 | 9/1972 | Hollis et al. ............. 260/619 D |

Primary Examiner—Norman Morgenstern
Attorney, Agent, or Firm—F. W. Brunner; J. A. Rozmajzl

[57] ABSTRACT

Phenolic antioxidants useful in the stabilization of oxidizable polymers such as polybutadiene, butadiene/styrene copolymers and polypropylene are prepared by reacting simple phenolic compounds with a pentacyclo-tetradeca-5,11-diene.

5 Claims, No Drawings

PHENOLIC ANTIOXIDANTS PREPARED FROM A PENTACYCLO-TETRADECA-5,11-DIENE

This invention relates to phenolic antioxidants for oxidizable polymers. More particularly it relates to reaction products of various phenolic compounds with pentacyclo [8.2.1.1$^{4,7}$,0$^{2,9}$,0$^{3,8}$] - tetradeca - 5,11 - diene (PCTD).

Those interested in stabilizing oxidizable polymers against oxidative degradation are constantly searching for new and effective antioxidants. When polymer color is important, it is desirable that the antioxidant be relatively non-discoloring. A problem that is not successfully solved by many of the previously known phenolic stabilizers is that they are in varying degrees too readily volatilized, and therefore escape from the materials which they are intended to stabilize during the rather extended service life to which such materials are subjected.

It is therefore an object of this invention to provide a new class of phenolic antioxidants which can be used as stabilizers for organic compounds and which stabilizers are relatively nondiscoloring and nonvolatile in polymers. Other objects will become apparent as this description proceeds.

In accordance with the present invention it has been found that the foregoing and additional object can be accomplished by employing as stabilizers for polymeric materials which are subject to the deleterious effects of oxygen, ozone and sunlight, reaction products of a phenol and pentacyclo [8.2.1.1$^{4,7}$,0$^{2,9}$,0$^{3,8}$] - tetradeca - 5,11 - diene (PCTD). The reaction products may be subsequently alkylated with a tertiary olefin if desired. The latter method will be referred to herein as the two-step method and the former method as the one-step method. The reaction products are relatively non-discoloring antioxidants with relatively low volatility.

In the one-step method the reaction product is prepared by reacting a mixture comprising (A) at least one phenol conforming to the following structural formula

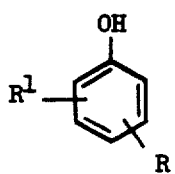

wherein R is selected from the group consisting of hydrogen, alkyl radicals having from 1 to 12 carbon atoms, cycloalkyl radicals having from 5 to 12 carbon atoms, aralkyl radicals having from 7 to 12 carbon atoms, substituted and unsubstituted aryl radicals having 6 to 12 carbon atoms, alkoxy radicals having from 1 to 12 carbon atoms, cycloalkoxy radicals having from 5 to 12 carbon atoms and aralkoxy radicals having from 7 to 12 carbon atoms and R$^1$ is selected from the group consisting of hydrogen and tertiary alkyl radicals having from 4 to 12 carbon atoms and (B) the pentacyclotetradeca-5,11-diene.

In the two-step process R$^1$ is hydrogen and the reaction product of the first step is reacted with an olefin selected from the group consisting of tertiary olefins having 4 to 12 carbon atoms (e.g., isobutylene, t-amylenes and t-hexylenes) and styrene.

Illustrative species of phenols which may be used in either the one step or two step processes are listed below.

phenol
o,m,p-cresol
o,m,p-isopropyl phenol
o,m,p-propyl phenol
o,m,p-ethyl phenol
o,m,p-methoxy phenol
o,m,p-ethoxy phenol
o,m,p-cyclohexyl phenol
o,m,p-benzyl phenol
o,m,p-phenoxy phenol
o,m,p-phenyl phenol
o,m,p-propoxy phenol
p-butyl phenol
p-hexyl phenol
p-octyl phenol
p-dodecyl phenol Illustrative species of phenols which may be used only in the one-step process are listed below.

2-tert.butyl-4-methyl phenol
2-tert.butyl-6-methyl phenol
6-tert.butyl-3-methyl phenol
2,6-ditert.butyl phenol
2-tert.butyl-4-methoxy phenol
2-tert.butyl-6-methoxy phenol
2-tert.butyl phenol
2-tert.hexyl-4-methyl phenol
2-tert.octyl-4-methyl phenol
2-tert.dodecyl-4-methyl phenol
2-tert.hexyl-4-methoxy phenol
2-tert.nonyl-4-phenoxy phenol
2-tert.pentyl-3-hexoxy phenol
2-(α,α-dimethylbenzyl)-4-ethoxy phenol
2-tert.heptyl-4-cyclohexoxy phenol When the one-step process is used, preferably R is in the para position and is a methyl or ethyl radical and preferably R$^1$ is in the ortho position. When the two-step process is used and R$^1$ is hydrogen, preferably R is methyl or ethyl and is in an ortho or para position.

The reaction between the diolefin and the phenolic compounds is effectively catalyzed by a Friedel-Crafts type catalyst, and in particular the more potent Friedel-Crafts catalysts such as aluminum chloride, zinc chloride, ferrous and ferric chloride and boron trifluoride, as well as complexes based on boron trifluoride.

Friedel-Crafts type catalysts include Lewis acid type acidic halides or proton acids. Friedel-Crafts catalysts and reactions are discussed in volume 1 of Friedel-Crafts and Related Reactions edited by George A. Olah, 1963, Interscience Publications, pages 25–91, and in Encyclopedia of Chemistry, 3rd. edition, Van Nostraand Reinhold Company, pages 470–471. These catalysts are illustrated by metal halides, aluminum chloride, aluminum bromide, aluminum iodide, ferric chloride, zinc chloride, zirconium chloride, boron fluorides (such as boron trifluoride and complexes thereof), acids such as sulfuric acid, aromatic sulfuric acids, phosphoric acid and hydrogen fluoride. Supported phosphoric acid, silica alumina and cation exchange resins are also included as Friedel-Crafts catalysts. Boron trifluoride and complexes based on boron trifluoride are preferred catalysts for the one-step process and the first step of the two-step process. The second step of the above described two-step reaction process, wherein the product obtained by reacting the olefin and a phenolic compound is further alkylated with a tertiary olefin, is effectively catalyzed by employing one or more of the customary acidic alkylation catalysts such as sulfuric acid, benzene sulfonic acid, toluene sulfonic acid, acid activated clays, boron trifluoride, zinc chloride, ferrous and ferric halides, aluminum halides and the stannous and stannic halides. Sulfuric acid, benzene sulfonic acid, toluene sulfonic acid and acid activated clay are preferred catalysts for the second step of the two-step process. Acidic alkylation catalysts include acidic ion exchange resins. The catalysts employed in both the first and second stages of the two-step process and in the one-step process are employed in the customary catalytic amounts, which will normally vary from 0.1 percent to 5.0 percent of catalyst based on the total weight of the reactants in the reaction which is to be catalyzed.

While boron trifluoride will function as an alkylation catalyst to catalyze the second step of the two-step process, it is not a particularly desirable alkylation catalyst since it tends to promote undesirable side reactions. It is therefore preferred to remove the boron trifluoride catalyst when it is employed in the first step of the reaction before proceeding with the second or alkylation step of the two-step process. The boron trifluoride catalyst may be effectively removed by destroying it with a basic material such as ammonia, or a solution of sodium hydroxide, sodium carbonate or calcium hydroxide. Alternatively the boron trifluoride catalyst may be removed along with excess phenolic materials by heating the reaction mixture to a temperature from 100° C. to 160° C. or above under vacuum. An additional method of removing the boron trifluoride catalyst employed in the first step of the two-step process and in the one-step process is by refluxing the reaction mixture from step one with a small quantity of an inert organic solvent such as toluene at a temperature between 150° C. and 160° C. or above. The acidic alkylation catalyst employed to catalyze the second step of the two-step process is normally neutralized with a suitable basic material such as a sodium carbonate solution.

The reaction between the phenol and diolefin in either process is preferably conducted at a temperature from 25° C. to 160° C. Even more preferred are reaction temperatures between 80° C. and 150° C. The reaction between the diolefin and a phenolic compound may be started at room temperature and since the reaction is rapid and exothermic the heat of reaction may be used to obtain the desired temperature. The only real temperature limitation in the reaction involves the consideration of the boiling points of the reactants.

Illustrative species of olefins that may be used in the second step of the two-step process are listed below.
 isobutylene
 2,4-dimethyl-1-heptene
 2-methyl-1-butene
 2-methyl-1-pentene
 2-methyl-2-pentene
 2-methyl-1-hexene
 2-methyl-2-hexene
 2,4,4-trimethyl-1-pentene
 α-methylstyrene
 2-methyl-1-nonene
 2-methyl-2-octene The molar ratio of the phenolic reactant to the PCTD can vary from 1:1 to 10:1. Preferably the lower limit is 2:1 and more preferably 3:1. The preferred upper limit is 5:1 and more preferably 4:1. In some instances it may be desirable to carry out the one-step process and the first step of the two-step process in an inert organic solvent such as benzene or toluene. The employment of a solvent is particularly desirable if a relatively low ratio of phenolic compound to diolefin is used. When the molar ratio of phenolic compound to diolefin is 4:1 or higher, the excess phenolic compound acts as an effective solvent and no additional solvent need be employed. At ratios of lower than 4:1, the use of a solvent should be considered.

The one-step process and the first step of the two-step process may be carried out by adding the diolefin to the mixture of phenolic compound and catalyst or the catalyst may be added gradually to the mixture of phenolic compound and diolefin. The first of these two procedures is preferred. The rate at which the reactants are combined can vary over a wide range as long as the temperature is kept below the boiling point of the lowest boiling reactant.

The second step of the two-step process involves alkylation of the product obtained in step one. In carrying out the second step of the process the product obtained from step one is dissolved in an inert hydrocarbon solvent such as benzene, toluene, etc. Alkylation is normally conducted at a temperature between 20° C. and 100° C. A preferred temperature range is between 60° C. and 80° C. If the tertiary olefin which is employed as an alkylation agent is a gas it may be added to the reaction under pressure but the pressures should not exceed 30 p.s.i. if excessive polymerization is to be avoided. In step two of the process it is also preferable to carry out the alkylation as rapidly as possible, however, the time within which the reaction is completed is dependent upon the activity of the alkylating agent used.

The amount of olefin used in the second step will depend upon the number of reactive sites available on the phenolic moiety of the product of the first step. The number of available sites will be dependent on such factors as the phenolic compound used, the ratio of PCTD to the phenolic compound and the number of substituents on the phenolic reactant. Normally the olefin is reacted with the product of the first step until no further reaction occurs, although less olefin may be used.

In the two-step process, the product of the first step can be stripped of excess phenolic reactant before the second step, but such stripping is not necessary.

The compounds of this invention are useful in protecting polymer in any form, e.g., polymer in latex form, unvulcanized polymer and vulcanized polymer. The method of addition of the antioxidant to the polymer is not critical. They may be added by any of the conventional means such as by adding to a polymer latex or cement, milling on an open mill or by internal mixing. They are highly efficient and are capable of being employed in relatively small amounts to effectively stabilize the polymers into which they are incorporated.

Polymers subject to deterioration by oxidation that can be conveniently protected by the age resisters described herein include substituted and unsubstituted, saturated and unsaturated, natural and synthetic polymers. The oxidizable natural polymers of interest include natural rubber in its various forms, e.g., pale crepe and smoked sheet, and balata and gutta percha. The oxidizable synthetic polymers are prepared from a single monomer (homopolymer) or a mixture of two or more copolymerizable monomers (copolymers) wherein the monomers are combined in a random distribution or block form. The monomers may be substituted or unsubstituted and may possess one or more double bonds, for example, diene monomers, both conjugated and nonconjugated, and monoolefins including cyclic and acyclic monoolefins, especially vinyl and vinylidene monomers. Examples of conjugated dienes are 1,3-butadiene, isoprene, chloroprene, 2-ethyl-1,3-butadiene, 2,3-dimethyl-1,3-butadiene and piperylene. Examples of nonconjugated dienes are 1,4-pentadiene, 1,4-hexadiene, 1,5-hexadiene, dicyclopentadiene, 1,5-cyclooctadiene and ethylidene norbornene. Examples of acrylic monoolefins are ethylene, propylene, 1-butene, isobutylene, 1-pentene and 1-hexene. Examples of cyclic monoolefins are cyclopentene, cyclohexene, cycloheptene, cyclooctene and 4-methylcyclooctene. Examples of vinyl monomers are styrene, acrylonitrile, acrylic acid, ethylacrylate, butylacrylate, methyl vinyl ether, vinyl acetate and vinyl pyridine. Examples of vinylidene monomers are α-methylstyrene, methacrylic acid, methyl methacrylate, ethylmethacrylate, glycidylmethacrylate and vinylidene chloride. Representative examples of the synthetic polymers used in the practice of this invention are polychloroprene; homopolymers of a conjugated 1,3-diene such as isoprene and butadiene, and in particular polyisoprenes and polybutadienes having essentially all of their repeat units combined in a cis-1,4 structure; copolymers of a conjugated 1,3-diene such as isoprene and butadiene with up to 50 percent by weight of at least one copolymerizable monomer including ethylenically unsaturated monomers such as styrene or acrylonitrile; butyl rubber, which is a polymerization product of a major proportion of a monoolefin and minor proportion of a multiolefin such as butadiene or isoprene; polyurethanes containing carbon to carbon double bonds; and polymers and copolymers of monoolefins containing little or no unsaturation, such as polyethylene, polypropylene, ethylene propylene copolymers and terpolymers of ethylene, propylene and a nonconjugated diene such as dicyclopentadiene, 1,4-hexadiene, ethylidene norbornene and methylene norbornene. Resins such as those described in U.S. Pat. No. 3,577,398 can also be protected.

The level of antioxidant necessary for measurable stabilization varies according to the nature of the polymer, the severity of the deteriorating conditions to which the polymer is exposed and the time it is exposed to such conditions. As is well known, unsaturated polymers such as natural rubber, SBR and polybutadiene are more susceptible to oxidative degradation than saturated polymers such as polyethylene and polypropylene, and therefore require higher amounts of antioxidant to achieve effective stabilization. An effective antioxidant amount of the disclosed antioxidants in unsaturated polymers will generally range from 0.05 to 5.0 parts by weight based on 100 parts by weight of the polymer, although it is commonly preferred to use from 0.25 or 0.5 part to 2.0 or 3.0 parts. In saturated polymers levels will range as low as 0.001 or 0.01 parrt. Normally amounts in excess of 1.0 part are unnecessary, although up to 5.0 parts and more can be used.

The following examples are illustrative but not restrictive as to the preparation of some of the antioxidants of the present invention.

EXAMPLE 1

In a three-neck round bottom flask equipped with thermometer, stirring rod, water condenser and dropping funnel was charged 106 grams of para-cresol and 3 grams of para-cresol $BF_3$ complex (25% $BF_3$). The flask contents were heated to 90°C. and then 45 grams PCTD was added over a 15 minute period. The reaction product was stirred at 90°C. to 98°C. for 25 minutes. The excess para-cresol was stripped off to a pot temperature of 205°C. at 24 millimeters of mercury. The residue weight was 93.5 grams. The resin color was light amber.

EXAMPLE 2

To 95 grams of a product prepared as in Example 1 using similar equipment was added 4 grams $H_2SO_4$ and 150 milliliters of toluene. The mixture was stirred at 60°C. until dissolved. Then isobutylene was added at 65°C. to 76°C. until no more would react (approximately 40 grams). The flask contents were then neutralized with 5 grams of $Na_2CO_3$ in 50 milliliters of water. After decanting, the product was stripped in the presence of 2 grams of dry $Na_2CO_3$ to a pot temperature of 170°C. at 15 millimeters of mercury. The resin weight was 122 grams.

EXAMPLE 3

Into the same equipment as described in Example 1 was charged 205 grams of phenol and 9 grams of para-cresol $BF_3$ complex (25% $BF_3$). The mixture was heated to 90°C. and then 100 grams of PCTD was added over a 15 minute period. The reaction mixture was stirred 20 minutes longer and then the excess phenol was stripped off to a pot temperature of 220°C. at 11 millimeters of mercury. The residue weight was 187 grams.

EXAMPLE 4

Ninety grams of the product prepared in Example 3 and 12 grams of toluene sulfonic acid were dissolved in 150 milliliters of toluene and heated to 75°C. At that temperature 200 grams of 2-methyl-1-pentene was added over a 45 minute period. The reaction product was neutralized with 15 grams of $Na_2CO_3$ in aqueous solution. After decanting, the flask contents were stripped to a pot temperature of 205°C. at 15 millimeters of mercury. The resin was 166 grams.

EXAMPLE 5

Thirty-five grams of the resin prepared in Example 3 and 6 grams of toluene sulfonic acid were dissolved in 100 grams of toluene. At 75°C. to 85°C. isobutylene was added until no more would react. The reaction product was neutralized with 8 grams of $Na_2CO_3$ in 60 milliliters of water. After decanting, one gram of dry $Na_2CO_3$ was added and volatiles stripped to a pot temperature of 240 at 11 millimeters of mercury. The resin weight was 56 grams.

EXAMPLE 6

Same as Example 1 except 119 grams of para-cresol, 50 grams of PCTD and 3 grams of para-cresol $BF_3$ complex were used. The resin weight was 105 grams.

EXAMPLE 7

To 105 grams of the resin prepared in Example 6 was added 8 grams of toluene sulfonic acid and 150 milliliters of toluene. The mixture was stirred at 70° C. until dissolved. Then 60 grams of 2-methyl-1-pentene was added over a 35 minute period. The flask contents were stirred one hour longer and then neutralized with 10 grams of $Na_2CO_3$ in 80 milliliters of water. After decanting, the reaction product was stripped in the presence of 1.5 grams of $Na_2CO_3$ to a pot temperature of 204° C. at 14 millimeters of mercury. The resin weight was 144 grams.

EXAMPLE 8

Two hundred thirteen grams of para-cresol and 10 grams of toluene sulfonic acid were heated to 90° C. Then 45 grams of PCTD was added over a 30 minute period. The flask contents were stirred at 85° C. to 90° C. for one hour and then neutralized with 10 grams of $Na_2CO_3$ in 70 milliliters of water. Toluene was added and the product filtered. The reaction product was stripped to a pot temperature of 205° C. at 10 millimeters of mercury.

EXAMPLE 9

Fifty grams of the product prepared in Example 8 and 12 grams of toluene sulfonic acid were dissolved in 150 milliliters of toluene. At 70° C., 50 grams of 2-methyl-1-pentene was added over a 30 minute period. The reaction mixture was stirred 2 hours longer and then neutralized with 10 grams of $Na_2CO_3$ in aqueous solution. After decanting, the product was stripped to a pot temperature of 170° C. at 20 millimeters of mercury. The residue weight was 62 grams.

EXAMPLE 10

To a flask is added 108 grams of para-cresol, 150 grams of toluene and 4 grams of $BF_3$ etherate. To the mixture of 90° C. is added 92 grams of PCTD over a 45 minute period. The reaction product is then stripped to a pot temperature of 190° C. under vacuum. The resin is redissolved in 300 grams of toluene and 25 grams of toluene sulfonic acid is then added. Isobutylene is added at 75°C. until no more will react. The catalyst is destroyed with 25 grams of sodium carbonate in aqueous solution. After decanting the reaction product is stripped to a pot temperature of 170° C. under vacuum.

EXAMPLE 11

One hundred sixty four grams of 2-tert.butyl-4-methyl phenol and 4 grams of $BF_3$ etherate are dissolved in 164 grams of toluene. Ninety two grams of PCTD are added over a 45 minute period at 80° C. to 90° C. The flask contents are stirred 30 minutes longer and then neutralized with 4 grams of sodium carbonate in aqueous solution. After decanting, 2 grams of dry sodium carbonate are added and the reaction product stripped to a pot temperature of 180° C. under vacuum.

EXAMPLE 12

One hundred sixty four grams of para-cresol and 2 grams of $BF_3$ etherate were heated to 90° C. Seventy grams of PCTD were added over a 20 minute period at 87° C. to 94° C. The combination was stirred 20 minutes longer and then neutralized with 4 grams of lime. The mixture was diluted with 200 grams of toluene and filtered. To the filtrate was added 28 grams of toluene sulfonic acid. One hundred sixty five grams of 2-methyl-1-pentene was added at 70° C. over a 1 hour period. The combination was cooled to 30° C. and 90 grams of 2-methyl-1-pentene were added over a 1 hour period. The reaction product was allowed to stir at room temperature for 16 hours. It was then neutralized with aqueous ammonium hydroxide and decanted. Ten grams of sodium carbonate were added and the reaction product stripped to a pot temperature of 150° C. at 18 millimeters of mercury. The weight of residue was 443 grams.

The products of Examples 1 to 12 are all antioxidants of the present invention.

Oxygen absorption and tensile retention tests were run. The oxygen absorption tests were conducted by dissolving in benzene portions of an unstabilized SBR polymer (1006). The benzene contained the antioxidant to be tested at a level of 1.00 part of antioxidant per 100 parts of SBR polymer. The cements so formed were poured onto aluminum foil so as to form a thin film. After drying the weight of rubber was obtained in connection with each sample. Thereafter the foil with the adhering rubber strip was placed in the oxygen absorption apparatus. The time required for each sample to absorb 1.0 percent oxygen was determined and recorded in the following Table I. This testing procedure is described in further detail in Industrial and Engineering Chemistry, 43, p. 456 (1951) and Industrial and Engineering Chemistry, 45, p. 392 (1953).

In addition tensile retention data was gathered on natural rubber extracted pale crepe gum stock. Aging was done in an oxygen bomb at 70° C. and 300 pounds per square inch for 72 hours. After aging tensile retention and weight increase were determined.

Polypropylene samples were prepared in the following manner. The stabilizer was dissolved in toluene to form a dilute solution. The stabilizer solution was added to the polypropylene (Pro-Fax 6501) by dispersing the stabilizer solution in the powdered polypropylene using a Henschel blender and agitating at 2800 rpm. After 15 minutes, the typical batch temperature approached 180° F. and a reasonable dispersion of the stabilizers was obtained. After 10 minutes only traces of the solvent remained. The stabilized polypropylene was then injection molded to produce tensile bars, said tensile bars conforming to ASTM D-638-64T. The tensile bars were aged at 140° C. in a forced air oven. When the crazing of the bars was visually judged to be severe enough to indicate a great reduction in tensile, the samples were judged to have failed.

The following are results obtained in SBR 1006 at the 1.0 part level at 100° C.

Table I

| Antioxidant | Hours to Absorb 1.0% $O_2$ |
| --- | --- |
| Example 2 | 385 |
| Example 3 | 153 |
| Example 4 | 166 |
| Example 5 | 266 |
| A[1] | 327 |
| B[2] | 282 |
| None | 9 |
| Example 7 | 503 |
| A | 390 |
| None | 9 |

[1]Similar to product of Example 2 with dicyclopentadiene substituted for PCTD and a 3:1 molar ratio of phenolic to diolefin rather than a 4:1 ratio. See U. S. Patent 3,305,522.

[2]Similar to product of Example 7 with dicyclopentadiene substituted for PCTD and a 3:1 molar ratio of phenolic to diolefin rather than a 4:1 ratio and 2-methyl-1-pentene substituted for isobutylene. See U. S. Patent 3,305,522.

A and B are not compounds within the present invention. A is a commercial antioxidant.

The product of Example 2 was prepared again in a similar fashion and compared again with A in SBR. The time to 1.0% oxygen absorption for A was 369 hours and for the product of Example 2 was 386 hours.

The results in Table II indicate the effectiveness of the present phenolic antioxidants in polypropylene.

Table II

| Antioxidant | Polypropylene Failure Point (days) |
|---|---|
| Example 2 | 40 |
| A | 20 – 25 |
| Example 7 | 15 – 20 |
| Example 3 | 5 – 7 |
| Example 4 | 3 – 5 |
| No additive | 1 – 3 |

Any of the previously described phenolic products could be substituted for any of the above phenolic products in the working examples and any previously described polymer could be substituted in the working examples. Such combination would result in polymers with improved resistance to oxidative degradation.

The use of the antioxidants of the present invention in the described polymers would not adversely affect the art-recognized uses of the polymers, e.g., the use of natural rubber or SBR in pneumatic vehicle tires.

While certain representative embodiments and details have been shown for the purpose of illustrating the invention, it will be apparent to those skilled in in this art that various changes and modifications may be made therein without departing from the spirit or scope of the invention.

I claim:

1. A reaction product prepared by reacting a mixture comprising (A) at least one phenolic reactant conforming to the following structural formula

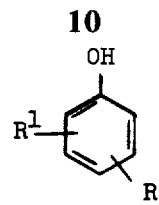

wherein R is selected from the group consisting of hydrogen, alkyl radicals having from 1 to 12 carbon atoms, cycloalkyl radicals having from 5 to 12 carbon atoms, aralkyl radicals having from 7 to 12 carbon atoms, and aryl radicals having 6 to 12 carbon atoms and $R^1$ is selected from the group consisting of hydrogen and tertiary alkyl radicals having from 4 to 12 carbon atoms and (B) pentacyclo [8.2.1.1$^{4,7}$.0$^{2,9}$.0$^{3,8}$]tetradeca-5,11-diene, in the presence of a Friedel-Crafts catalyst, at a temperature of from 25° C. to 160° C. the molar ratio of the pentacyclo compound to the phenolic reactant being from 1:1 to 1:10.

2. An alkylated reaction product prepared by reacting the reaction product of claim 1 with a tertiary olefin having 4 to 12 carbon atoms in the presence of an acidic alkylation catalyst at a temperature of from 20° C. to 100° C.

3. The reaction product according to claim 1 wherein the Friedel-Crafts catalyst is selected from the group consisting of boron trifluoride and complexes based on boron trifluoride.

4. The alkylated reaction product according to claim 2 wherein the Friedel-Crafts catalyst is selected from the group consisting of boron trifluoride and complexes based on boron trifluoride.

5. The reaction product according to claim 2 wherein the phenolic reactant is p-cresol, the Friedel-Crafts catalyst is a p-cresol $BF_3$ complex, the tertiary olefin is isobutylene and the acidic alkylation catalyst is toluene sulfonic acid.

* * * * *